March 22, 1960 H. H. HAAS 2,929,367

ENGINE ACCESSORY DRIVE

Filed Nov. 10, 1958 2 Sheets-Sheet 1

INVENTOR.
HERBERT H. HAAS
BY
ATTORNEYS

March 22, 1960  H. H. HAAS  2,929,367
ENGINE ACCESSORY DRIVE
Filed Nov. 10, 1958  2 Sheets-Sheet 2

INVENTOR.
HERBERT H. HAAS
BY
ATTORNEYS

United States Patent Office 2,929,367
Patented Mar. 22, 1960

2,929,367
ENGINE ACCESSORY DRIVE

Herbert Heinrich Haas, Royal Oak, Mich., assignor to Continental Aviation and Engineering Corporation, Detroit, Mich., a corporation of Virginia Application November 10, 1958, Serial No. 772,857

5 Claims. (Cl. 123—41.65)

My invention relates to internal combustion engines of generally V-type construction and more particularly to a new accessory drive arrangement for such engines.

Arrangement of accessories such as fuel injection pumps, starters, generators, and cooling fans for internal combustion engines is always a problem deserving careful consideration in development, since such factors as accessibility for maintenance and repair and economy of space must be achieved without causing interference with efficient engine operation or hindrance with cooling air flow. In addition, simplicity of the accessory drive means should be aimed at for the most effective operation and ease of accessory replacement.

An object of the present invention is to improve engine construction by providing a simplified arrangement of accessories and accessory drive means.

Another object of the invention is to simplify engine accessory driving means by providing a bridge-like cooling fan structure and fan driving mechanism with other accessories disposed beneath and independent of the fan.

A further object of the invention is to improve engine cooling by constructing a cooling fan supporting means having a minimum hindrance to cooling air flow.

A still further object of the invention is to improve engine accessory drive and mounting means by constructing a generally V-type engine with engine accessories mounted on the crankcase between the banks of engine cylinders and with a tubular fan carrying means bridging the accessories and supported at one end by the accessory drive means housing disposed on one end of the crankcase.

For a more complete understanding of my invention, reference may be had to the accompanying drawings illustrating preferred embodiments of the invention in which like references refer to like parts throughout the several views and in which—

Figure 1:
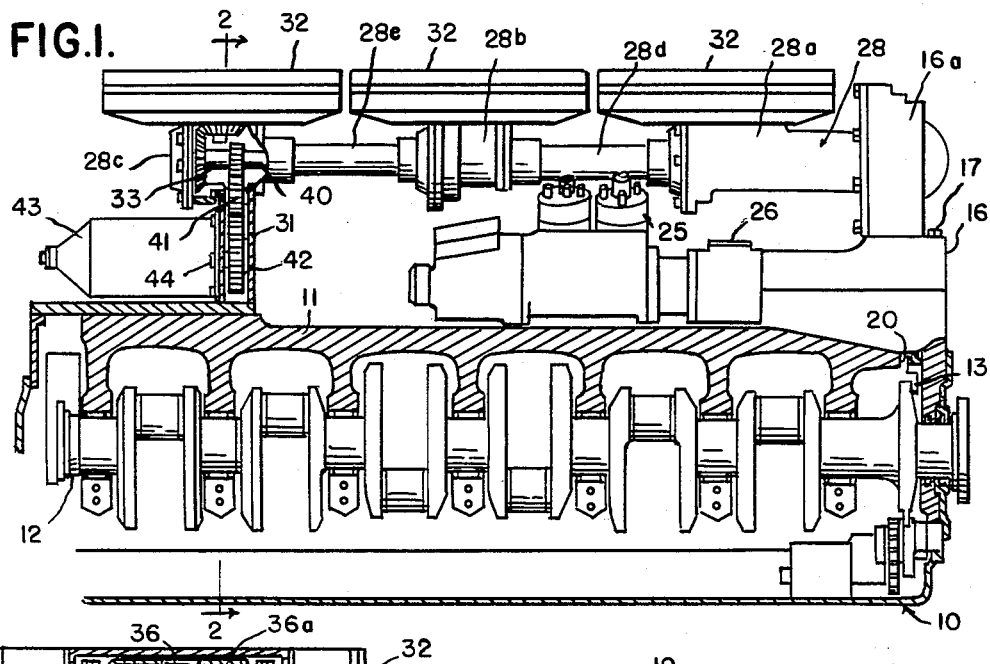
Fig. 1 is a side view, partially in section, of a preferred air-cooled internal combustion engine embodying the invention.

A preferred air cooled engine 10 is illustrated as comprising a crankcase structure 11 supporting a conventional crankshaft 12 having a drive gear 13 adjacent the flywheel end of the crankcase (flywheel not shown), and two banks of engine cylinders 14 preferably arranged in a substantially 90 degree V formation and secured to the crankcase 11 by means of studs or bolts 15. Other types of engines and engines having other cylinder bank arrangements from 60 degree to 180 degree V formation, may also utilize the present invention.

An accessory driving housing 16 extending substantially vertically from the top of the gear end of the crankcase 11 is secured by any means such as bolts 17, and carries an accessory driving gear 18 and a fan driving gear 19, the accessory gear 18 preferably connected with the crankshaft drive gear 13 through a slot 20 in the crankcase 11, the gear 19 being above the gear 18 and driven thereby.

Engine accessories, such as a fuel injection pump 25 mounted on housing 26, are disposed on top of the crankcase 11 intermediate the banks of engine cylinders 14 and are connected by any means such as an accessory drive shaft 27 with the accessory driving gear 18. A substantial tubular fan supporting structure 28 comprising fan gear housings 28a, 28b, 28c interconnected with shaft housings 28d and 28e, is supported at one end by the upper section 16a of the accessory drive housing 16. The other end of the fan supporting structure 28 may be supported on top of the crankcase by any means such as a second accessory drive housing structure 31 as shown in Fig. 1.

A plurality of fan structures 32 are carried by the fan supporting structure 28 and are thus disposed intermediate the banks of engine cylinders 14 and vertically spaced from the crankcase 11. The fan supporting structure 28 bridges the pumps 25 or other desired accessories and is so constructed and arranged to have a minimum interference with the flow of cooling air.

Figure 3:
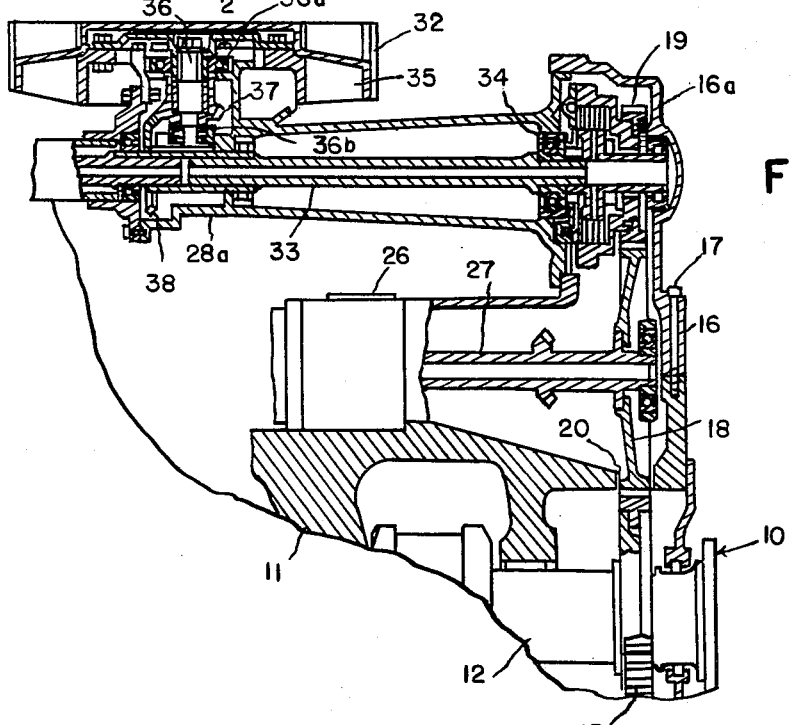
Fig. 3 is a fragmentary longitudinal cross-sectional view of the accessory drive section of Fig. 1.
Figure 2:
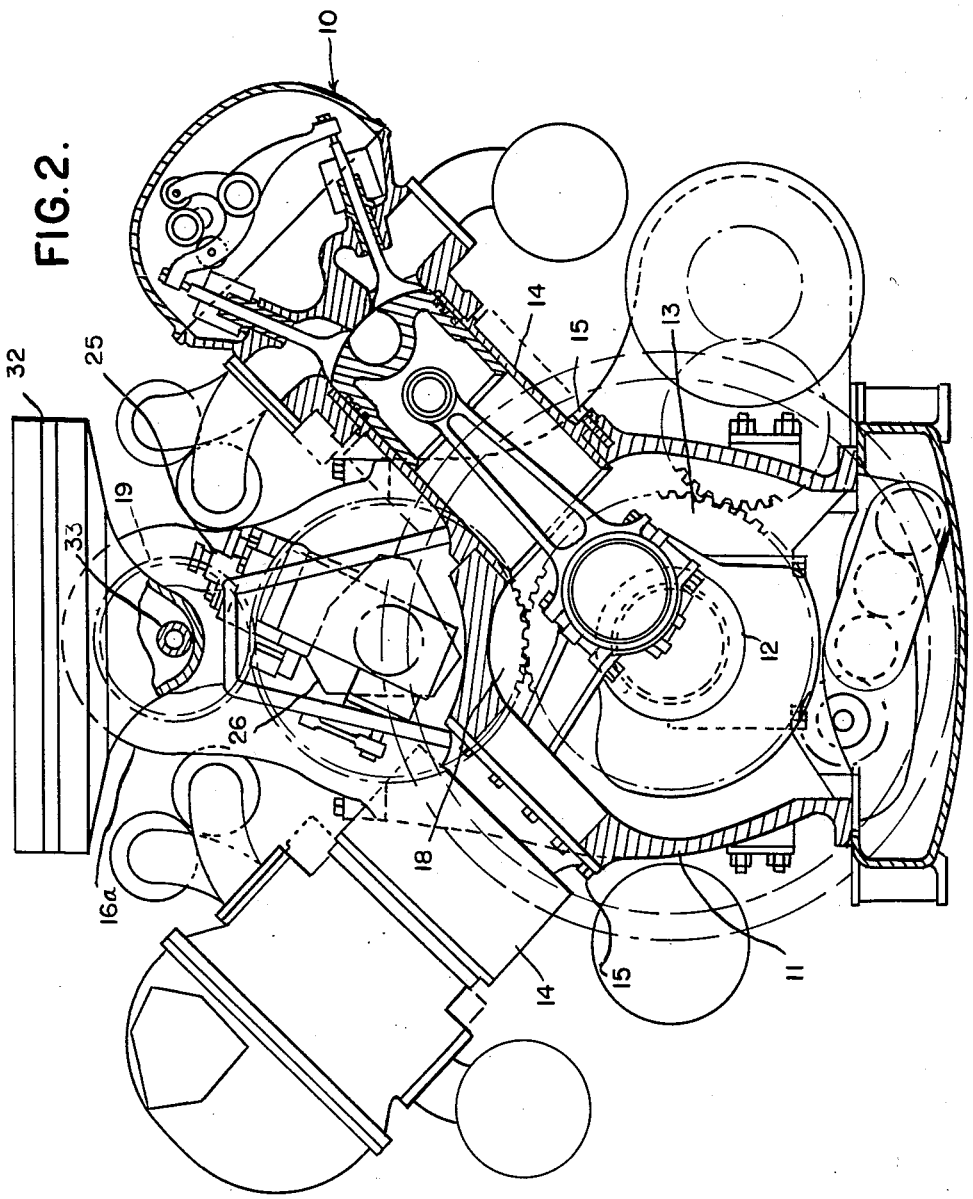
Fig. 2 is a cross sectional view of the engine taken substantially on the line 2—2 of Fig. 1.

A multiple section fan drive shaft 33 is carried by bearings 34 in the fan supporting structure 28 and is drivingly connected with the fan driving gear 19 as illustrated in Fig. 3. The fan structure 32 comprises fan blades 35 mounted on a vertical rotatable shaft 36, and a driven gear 37 secured to the shaft 36 and operably connected with a drive gear 38 mounted on the drive shaft 33. The shaft 36 is carried by bearings 36a and 36b mounted in the fan gear housing 28a, as shown in Fig. 3. Similar supporting and fan driving arrangements are likewise provided in the other housings 28b and 28c.

A driving gear 40 is mounted on the shaft 33 and is drivingly connected by such means as an idler gear 41 to the driven gear 42 of another accessory such as a generator 43 preferably mounted on the second accessory drive housing 31 by any means such as bolts 44, as shown in Fig. 1.

The entire fan supporting structure 28, as will be seen, may be removed vertically from the engine without disturbing other accessories and equipment disposed in the space bridged by the structure 28, providing for rapid maintenance on the engine.

It is apparent that numerous different engine configurations may effectively utilize the fan and accessory construction of this invention, the basic idea being that the fans as well as the fan driving means are disposed intermediate the banks of cylinders and are completely carried by the fan supporting structure which substantially bridges the engine accessories and which is supported at the ends. This arrangement provides for a compact engine structure having readily accessible components and adapted for effective cylinder and accessory cooling.

I claim:

1. In an internal combustion engine of generally V-type construction and having a crankcase, a crankshaft carried longitudinally in said crankcase and having a drive element at one end thereof, and two banks of engine cylinders, an elongated fan supporting structure disposed longitudinally intermediate said banks of cylinders and spaced from said crankcase, a cooling fan structure carried by said supporting structure, and drive means carried by said supporting structure and operatively connected with said crankshaft drive element and with said fan structure, engine accessories disposed intermediate said banks of cylinders and operatively connected with said crankshaft drive element, and separate mounting means carried on opposite ends of said crankcase on the upper surface thereof intermediate said banks of cylinders, said mounting means respectively supporting the ends of said fan supporting structure to thereby bridge said engine accessories.

2. In an internal combustion engine of generally V-type construction and having a crankcase, a crankshaft carried longitudinally in said crankcase and having a drive element at one end thereof, and two banks of engine cylinders, an elongated fan supporting structure disposed longitudinally intermediate said banks of cylinders and spaced from said crankcase, a cooling fan structure carried by said supporting structure, and drive means carried by said supporting structure and operatively connected with said crankshaft drive element and with said fan structure, engine accessories disposed intermediate said banks of cylinders and operatively connected with said crankshaft drive element, and separate mounting means carried on said crankcase for respectively supporting the ends of said fan supporting structure to thereby bridge said engine accessories, one of said mounting means disposed at the end of said crankcase adjacent said crankshaft drive element and comprising an accessory drive housing, operatively connected fan and accessory driving elements carried in said accessory drive housing and respectively drivingly connected with said fan drive means and said engine accessories, and means drivingly connecting said driving elements with said crankshaft drive element.

3. In an internal combustion engine of generally V-type construction having a crankcase, a crankshaft carried longitudinally in said crankcase and having a drive element at one end thereof, and two banks of engine cylinders, an elongated fan supporting structure disposed longitudinally intermediate said banks of cylinders and spaced from said crankcase, a cooling fan structure carried by said supporting structure, and drive means carried by said supporting structure and operatively connected with said crankshaft drive element and with said fan structure, engine accessories disposed intermediate said banks of cylinders and operatively connected with said crankshaft drive element, separate mounting means carried on said crankcase for respectively supporting the ends of said fan supporting structure to thereby bridge said engine accessories, said fan supporting structure comprising a substantially tubular housing having an enlarged intermediate gear housing, a drive shaft rotatably carried in said tubular housing and provided with a driving gear disposed in said gear housing, said cooling fan structure comprising a fan and a driven gear rotatably carried by said intermediate gear housing and driven by said driving gear.

4. In an internal combustion engine of generally V-type construction and having a crankcase, a crankshaft carried longitudinally in said crankcase and having a drive element at one end thereof, and two banks of engine cylinders, an elongated fan supporting structure disposed longitudinally intermediate said banks of cylinders and spaced from said crankcase, a cooling fan structure carried by said supporting structure, drive means carried by said supporting structure and operatively connected with said crankshaft drive element and with said fan structure, engine accessories disposed intermediate said banks of cylinders and operatively connected with said crankshaft drive element, separate mounting means carried on said crankcase for respectively supporting the ends of said fan supporting structure to thereby bridge said engine accessories, one of said mounting means comprising an accessory drive housing, an accessory drive element carried by said accessory drive housing and operatively connected with one of said accessories and with said crankshaft drive element, the other of said mounting means comprising a second accessory drive housing, another of said engine accessories being supported by said second accessory drive housing, another accessory driving element carried by said second accessory drive housing and operatively connected with said fan drive means and with said other engine accessory.

5. In an internal combustion engine of generally V-type construction and having a crankcase, a crankshaft carried longitudinally in said crankcase and having a drive element at one end thereof, and two banks of engine cylinders, separate support housings mounted on opposite ends of said crankcase on the upper surface thereof intermediate said banks of cylinders, driving elements carried by one of said support housings and drivingly connected with said crankshaft drive element, an engine accessory disposed intermediate said banks of cylinders and said support housings, said accessory being operatively connected with said driving elements, an elongated fan supporting structure carried at opposite ends respectively by said support housings, a cooling fan carried by said fan supporting structure, drive means carried by said fan supporting structure and operatively connecting said cooling fan with said driving elements, said fan supporting structure being spaced from said crankcase to bridge said accessory.

References Cited in the file of this patent

UNITED STATES PATENTS

| 818,735 | Bogart | Apr. 24, 1906 |
| 2,573,544 | Colby | Oct. 30, 1951 |
| 2,725,949 | Gordanier | Dec. 6, 1955 |
| 2,862,484 | Haas et al. | Dec. 2, 1958 |